United States Patent
Fan et al.

(10) Patent No.: US 10,716,146 B2
(45) Date of Patent: Jul. 14, 2020

(54) UNIVERSAL RESERVATION SIGNAL DESIGN FOR WIFI AND NR-SS

(71) Applicant: QUALCOMM Incorporated, San Diego, CA (US)

(72) Inventors: Zhifei Fan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,754

(22) Filed: Sep. 27, 2018

(65) Prior Publication Data

US 2019/0104548 A1   Apr. 4, 2019

Related U.S. Application Data

(60) Provisional application No. 62/567,067, filed on Oct. 2, 2017.

(51) Int. Cl.
*H04W 74/08* (2009.01)
*H04W 72/04* (2009.01)
*H04W 56/00* (2009.01)

(52) U.S. Cl.
CPC ... *H04W 74/0816* (2013.01); *H04W 72/0413* (2013.01); *H04W 74/0891* (2013.01); *H04W 56/00* (2013.01)

(58) Field of Classification Search
CPC ......... H04W 74/0816; H04W 72/0413; H04W 74/0891; H04W 56/00

(Continued)

(56) References Cited

U.S. PATENT DOCUMENTS

2012/0264471 A1* 10/2012 Gerhardt ................ H04B 1/713
                                                        455/509
2017/0142743 A1   5/2017 Yoon et al.
(Continued)

FOREIGN PATENT DOCUMENTS

WO   WO-2016167623 A1   10/2016
WO   WO-2017065875 A1   4/2017

OTHER PUBLICATIONS

International Search Report and Written Opinion—PCT/US2018/053417—ISA/EPO—dated Jan. 2, 2019.
(Continued)

*Primary Examiner* — Obaidul Huq
(74) *Attorney, Agent, or Firm* — Qualcomm Incorporated

(57) ABSTRACT

A universal Channel Reservation Signal (CRS) is transmitted by a wireless network node on a frequency channel upon successful Clear Channel Assessment (CCA). The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The universal CRS can be transmitted and successfully received and processed by both NR-SS devices and devices of at least one other wireless communication protocol having a different numerology, such as WiFi. Thus, information can be shared and used to avoid transmitting or to reduce or avoid collisions and interference between devices of different RATs.

28 Claims, 7 Drawing Sheets

(58) Field of Classification Search
USPC .......................................... 370/310, 328, 329
See application file for complete search history.

(56) References Cited

U.S. PATENT DOCUMENTS

2018/0110057 A1    4/2018  Park et al.
2019/0230696 A1*   7/2019  Kim ..................... H04W 72/12

OTHER PUBLICATIONS

Mediatek Inc: "LAA Reservation Signal Design", 3GPP Draft; R1-151938 LAA Reservation Signal Design, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20, 2015-Apr. 24, 2015, Apr. 19, 2015 (Apr. 19, 2015), pp. 1-4, XP050934792, Retrieved from the Internet: URL: http://www.3gpp.org/ftp/Meetings_3GPP_SYNC/RAN1/Docs/ [retrieved on Apr. 19, 2015].

* cited by examiner

UNIVERSAL RESERVATION SIGNAL DESIGN FOR WIFI AND NR-SS

CROSS-REFERENCE TO RELATED APPLICATIONS

The present application claims the benefit of U.S. Provisional Patent Application No. 62/567,067, filed on Oct. 2, 2017, the disclosures of which are incorporated herein by reference in their entirety.

BACKGROUND

Field

Aspects of the present disclosure relate generally to wireless communication systems, and more particularly, to channel reservation signal procedures for both WiFi network nodes and NR-SS network nodes.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Recently, interest has risen regarding coexistence of devices operating according to New Radio-Shared Spectrum (NR-SS) wireless communication protocols and devices operating according to other wireless communication protocols, such as WiFi. Energy Detection (ED) is a Clear Channel Assessment (CCA) mechanism that has been employed by wireless devices as a main coexistence mechanism. The ED mechanism, also known as Listen Before Talk (LBT), requires a transmitter to listen to a frequency channel and determine that energy on the channel is below a threshold before transmitting on the channel. However, this mechanism only enables the transmitter to be aware of ongoing transmissions by other devices. Collisions may still occur due to delay between a successful CCA and the beginning of transmission by the transmitter. To address this issue, a Channel Reservation Signal has been proposed which is transmitted by the transmitter on the channel immediately upon successful CCA. Additionally, transmitters of the same technology can use transmitted information, such as duration of a transmission opportunity (TXOP), interference level, etc. to determine that they need to reduce transmission power on a frequency channel. This information can be transmitted in a Network Allocation Vector (NAV) message. However, NR-SS devices and devices of other Radio Access Technologies (RATs) cannot successfully receive this information from one another because they employ different numerologies, including different sampling rates (i.e., symbol lengths) and different subcarrier spaces (i.e., frequency bands).

SUMMARY

In one aspect of the disclosure, a method of wireless communication includes performing, by a wireless network node, a successful clear channel assessment (CCA) on a frequency channel in accordance with a listen before talk (LBT) protocol procedure. The method additionally includes generating a channel reservation signal by the wireless network node. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The method also includes transmitting, by the wireless network node in response to the successful CCA, the channel reservation signal on the frequency channel.

In another aspect of the disclosure, a wireless communication apparatus has means for performing, by a wireless network node, a successful clear channel assessment (CCA) on a frequency channel in accordance with a listen before talk (LBT) protocol procedure. The apparatus additionally has means for generating a channel reservation signal by the wireless network node. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The apparatus also includes means for transmitting, by the wireless network node in response to the successful CCA, the channel reservation signal on the frequency channel.

In another aspect of the disclosure, a non-transitory computer-readable medium has program code recorded thereon, including program code executable by a computer for causing the computer to perform, by a wireless network node, a successful clear channel assessment (CCA) on a frequency channel in accordance with a listen before talk (LBT) protocol procedure. The non-transitory computer-readable medium additionally has program code recorded thereon that includes program code executable by the computer for causing the computer to generate a channel reservation signal, by the wireless network node. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The non-transitory computer-readable medium also has program code recorded thereon that includes program code executable by the computer for causing the computer to transmit by the wireless network node in response to the successful CCA, the channel reservation signal on the frequency channel.

In another aspect of the disclosure, an apparatus configured for wireless communication has at least one processor and a memory coupled to the at least one processor. The at least one processor is configured to perform, by a wireless network node, a successful clear channel assessment (CCA) on a frequency channel in accordance with a listen before talk (LBT) protocol procedure. The at least one processor is additionally configured to generate a channel reservation signal, by the wireless network node. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The at least one processor is also configured to transmit, by the wireless network node in response to the successful CCA, the channel reservation signal on the frequency channel.

In another aspect of the disclosure, a method of wireless communication includes receiving on a frequency channel, by a wireless network node, a channel reservation signal transmitted by the other wireless network node in response to a successful clear channel assessment (CCA) performed by the other wireless network node on the frequency channel in accordance with a listen before talk (LBT) protocol procedure. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The method additionally includes decoding, by the wireless network node, the channel reservation signal.

In another aspect of the disclosure, a wireless communication apparatus has means for receiving, on a frequency channel by a wireless network node, a channel reservation signal transmitted by another wireless network node in response to a successful clear channel assessment (CCA) performed by the other wireless network node on the frequency channel in accordance with a listen before talk (LBT) protocol procedure. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The apparatus additionally has means for decoding, by the wireless network node, the channel reservation signal.

In another aspect of the disclosure, a non-transitory computer-readable medium has program code recorded thereon that is executable by a computer for causing the computer to receive on a frequency channel, by a wireless network node, a channel reservation signal transmitted by another wireless network node in response to a successful clear channel assessment (CCA) performed by the other wireless network node on the frequency channel in accordance with a listen before talk (LBT) protocol procedure. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The non-transitory computer-readable medium also has program code recorded thereon that is executable by the computer for causing the computer to decode, by the wireless network node, the channel reservation signal.

In another aspect of the disclosure, an apparatus configured for wireless communication has at least one processor and a memory coupled to the at least one processor. The at least one processor is configured to receive on a frequency channel, by a wireless network node, a channel reservation signal transmitted by another wireless network node in response to a successful clear channel assessment (CCA) performed by the other wireless network node on the frequency channel in accordance with a listen before talk (LBT) protocol procedure. The channel reservation signal includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. The at least one processor is additionally configured to decode, by the wireless network node, the channel reservation signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
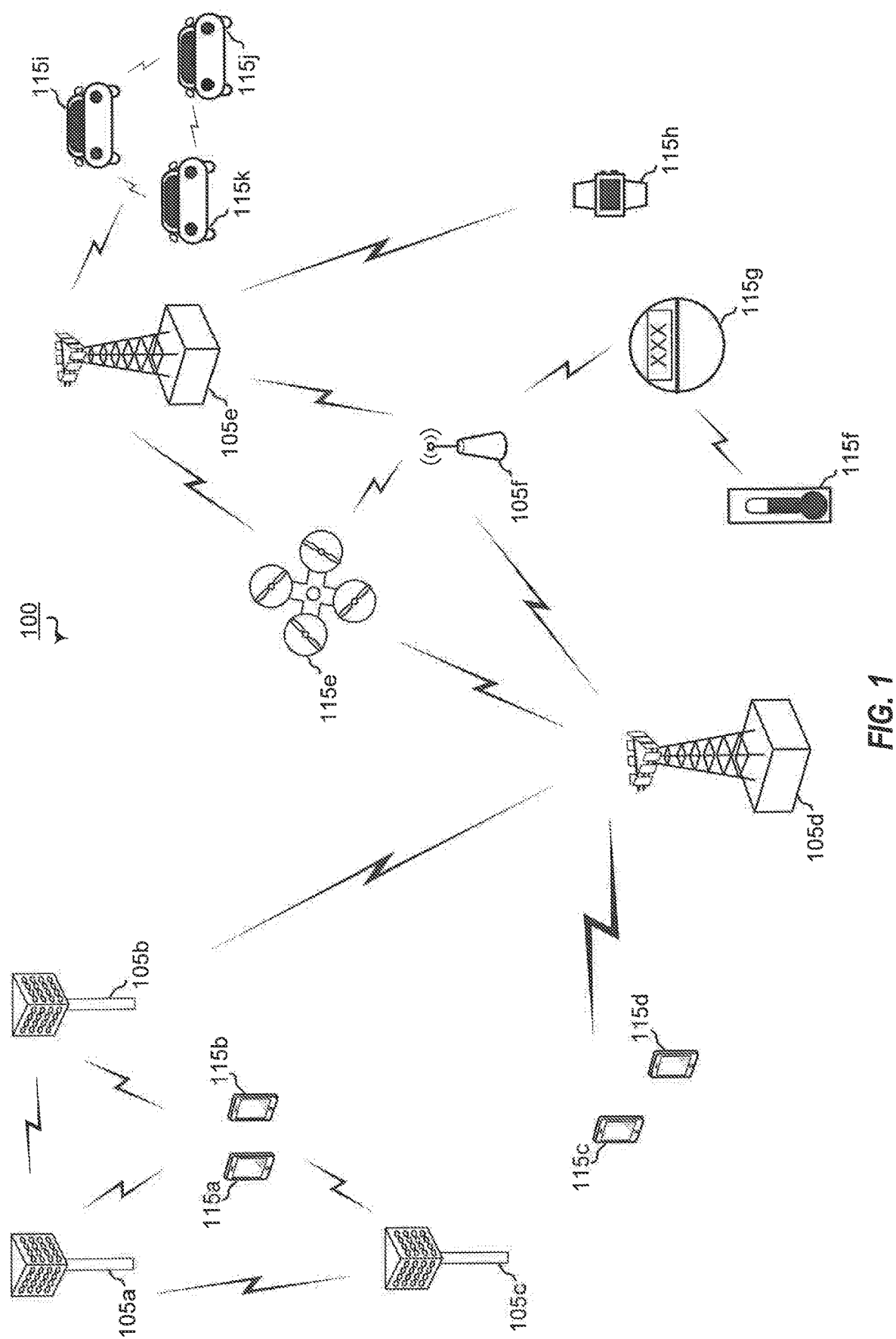
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
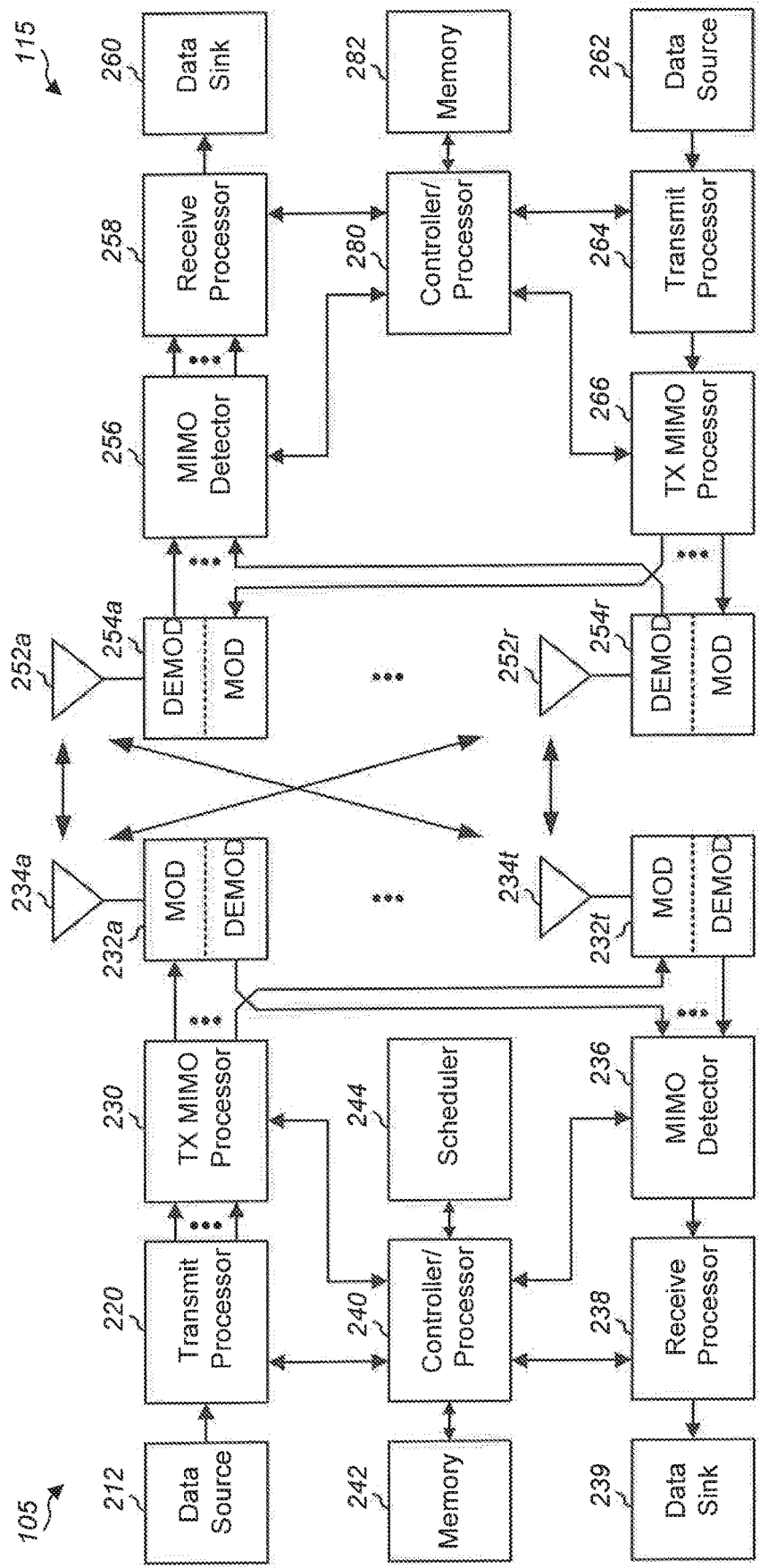
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240, which is connected to a memory 242. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
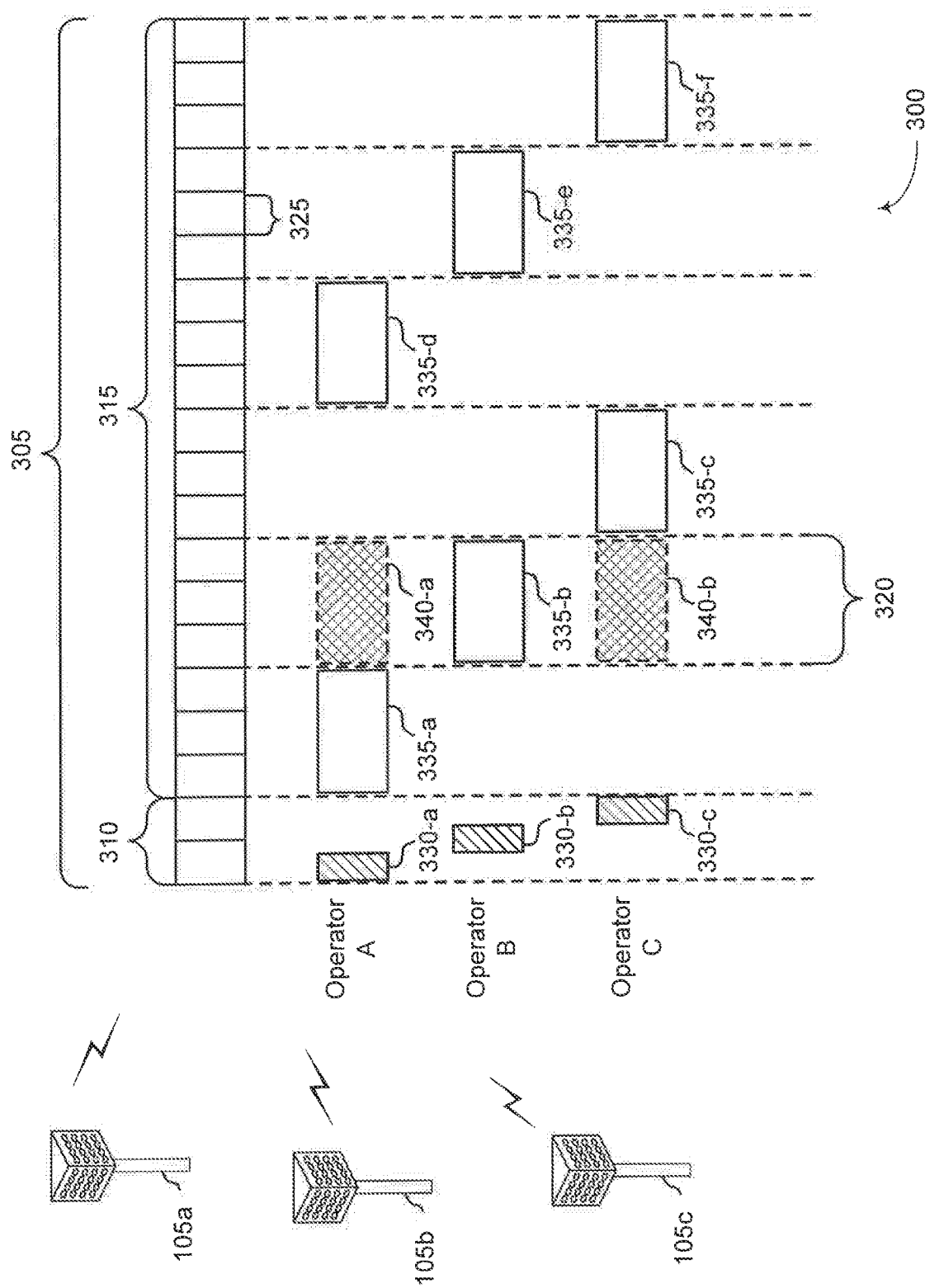
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

As noted above, interest has recently risen regarding coexistence of devices operating according to New Radio-Shared Spectrum (NR-SS) wireless communication protocols and devices operating according to other wireless communication protocols, such as WiFi. Energy Detection (ED) is a Clear Channel Assessment (CCA) mechanism that has been employed by wireless devices as a main coexistence mechanism. The ED mechanism, also known as Listen Before Talk (LBT), requires a transmitter to listen to a frequency channel and determine that energy on the channel is below a threshold before transmitting on the channel. However, this mechanism only enables the transmitter to be aware of ongoing transmissions by other devices. Collisions may still occur due to delay between a successful CCA and the beginning of transmission by the transmitter. To address this issue, a Channel Reservation Signal has been proposed which is transmitted by the transmitter on the channel immediately upon successful CCA. Additionally, transmitters of the same technology can use transmitted information, such as duration of a transmission opportunity (TXOP), interference level, etc. to determine that they need to reduce transmission power on a frequency channel. This information can be transmitted in a Network Allocation Vector (NAV) message. However, NR-SS devices and devices of other Radio Access Technologies (RATs) cannot successfully receive this information from one another because they employ different numerologies, including different sampling rates (i.e., symbol lengths) and different subcarrier spaces (i.e., frequency bands).

Figure 4A:
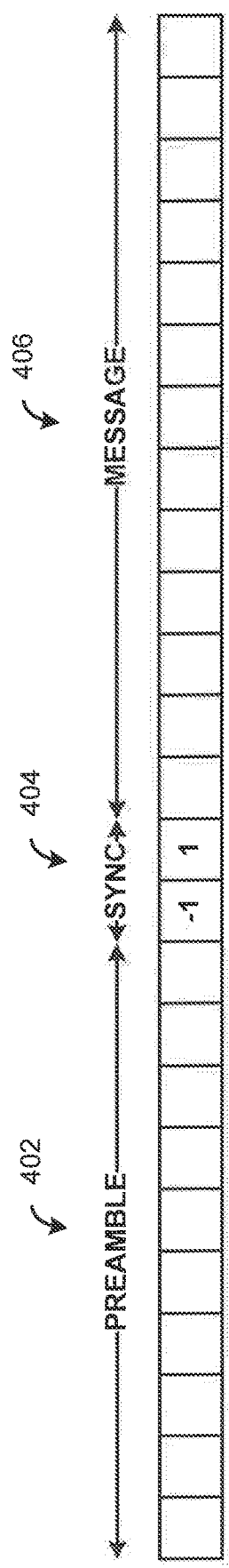
FIG. 4A is a block diagram illustrating an example of a universal channel reservation signal (CRS) according to one aspect of the present disclosure.

Referring to FIG. 4A, the present disclosure proposes a universal CRS 400 that can be transmitted and successfully received and processed by both NR-SS devices and devices of at least one other wireless communication protocol having a different numerology, such as WiFi. The disclosed universal CRS utilizes a numerology of another Radio Access Technology (RAT), and thus, another wireless communication protocol. As a result, information can be shared with devices of other RATs, and this information can be used to avoid transmitting or to reduce transmission power on frequency channels that are reserved based on a successful CCA. Advantageously, collisions and interference between devices of different RATs can be reduced or avoided.

Due to the different numerologies, a time domain signal is presently preferred. The CRS 400 may be comprised of a preamble 402 and a message 406, where the preamble 402 is used to identify the upcoming transmission, and the message 406 can indicate necessary information, such as details of a TXOP, a target node, an interference level, a Radio Access Technology (RAT) of the transmitting and/or target node, etc. The proposed CRS 400 may employ the same numerology as the other wireless communication protocol for the preamble 402 and the message 406. For example, it is envisioned that the preamble 402 may be the same as the Short Training Field (STF) used in WiFi for coarse timing estimation and coarse frequency offset estimation. However, it is also envisioned that other preamble patterns, such as currently used patterns of other technologies and/or future patterns of WiFi and/or other technologies, may be employed for the preamble. It is further envisioned that patterns and numerologies of multiple, different RATs may be combined within the preamble.

The skilled person will recognize that the STF of WiFi is currently composed of 13 tones with ×4 subcarrier spacing, and entails ten repetitions of consecutively identical waveforms each having a time domain length of 0.8 us. These consecutively identical waveforms of the STF are represented herein as [1, 1, 1, 1, 1, 1, 1, 1, 1, 1]. It should be understood that WiFi devices employ autocorrelation based detection to detect the STF and thus would detect either [1, 1, 1, 1, 1, 1, 1, 1, 1, 1] or [−1, −1, −1, −1, −1, −1, −1, −1, −1, −1] as the STF. Various examples set forth herein employ the current STF and WiFi numerology for the preamble of the universal CRS, but it should be understood that this pattern and numerology is only one example of the types of patterns and numerologies that may be utilized.

The message 406 of the proposed universal CRS 400 employs a time domain waveform to convey basic information, and uses the same numerology as that of the preamble. Accordingly, in the example that utilizes the WiFi STF for the preamble, the message may be composed partly or entirely of waveforms having the same short period as the short period waveforms of the preamble. Thus, one bit may be conveyed by one short period waveform, such that the short period waveform is modulated by the data bits. Also, since the preamble 402 and the message 406 employ the same short period, a synchronization (SYNC) field 404 may be inserted between the preamble 402 and the message 406 of the universal CRS 400. This SYNC field 404 may use the same short period waveform as the preamble 402 and the message 406, or it may use a different short period waveforms. The SYNC field 404 may also be composed of two waveforms or of another number of waveforms. It is envisioned that, in one example, the SYNC field 404 may be composed of exactly two short period waveforms having symbols corresponding to [−1, 1], [−1, −1], or [1, −1].

Figure 4B:
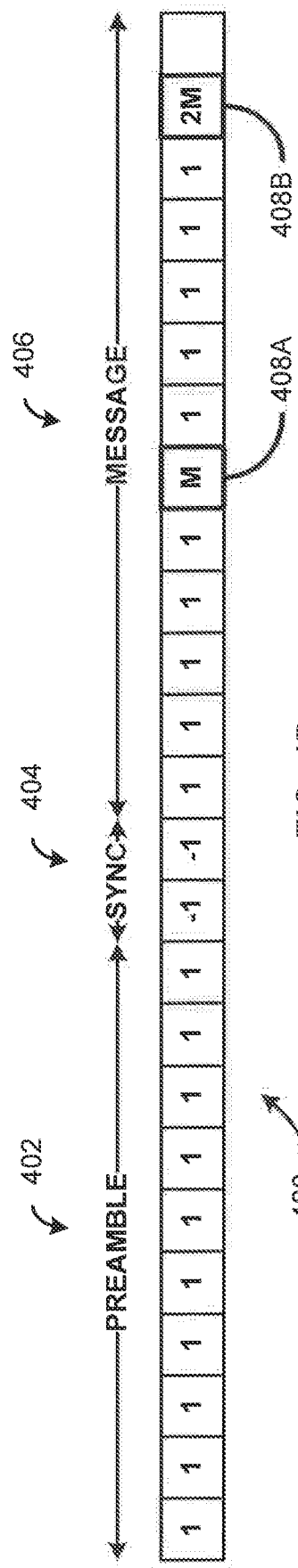
FIG. 4B is a block diagram illustrating details of an example encoding of a universal CRS according to one aspect of the present disclosure.

Referring to FIG. 4B, an example universal CRS 400 utilizes the current WiFi STF field for the preamble. In this example, it should be understood that, where the preamble 402 has ten consecutively identical waveforms and is detected on that basis using autocorrelation based detection, an issue may arise if the message 406 also contains ten or more consecutively identical waveforms. For example, if this portion of the data of the message 406 has a higher signal metric than the preamble 402, then the receiver may mistakenly identify this portion of the message 406 as the preamble, and thus incorrectly identify the start of the message 406. A similar issue may arise if the first bit or if both bits of the SYNC field 404 are set to 1, because the receiver will then expect eleven or twelve consecutive 1s before the message starts. Yet, if the last bit or both bits of the SYNC field 404 are set to −1, and if the first eight or nine bits of the message 406 are also set to −1, then there is also a possibility that the receiver will mistake the combination of these −1 bits as the preamble 402 due to the use of autocorrelation based detection. Accordingly, one way to avoid this issue is to encode the data of the message 406 in such a way as to ensure that, depending on the contents of the SYNC field 404, a series of eight or more, nine or more, ten or more, eleven or more, or twelve or more consecutively identical waveforms does not occur in the message 406. This solution may be implemented by inserting bits into the data of the message in an agreed upon manner. Alternatively or additionally, the solution may be implemented by selecting an appropriate encoding matrix, using a mask to alter bits of the data of the message, puncturing the data of the message, or a combination of these techniques. In such cases, it is envisioned that an additional field may be added to the CRS 400 to indicate to the receiver a particular matrix, mask, puncturing pattern, or other selections made in the encoding. It is envisioned that such a field may be implemented as one or more bits of the SYNC field 404, or may be a separate field that is prepended to the CRS 400, adjacent to the SYNC field 404, or appended to the CRS 400.

Figure 4C:
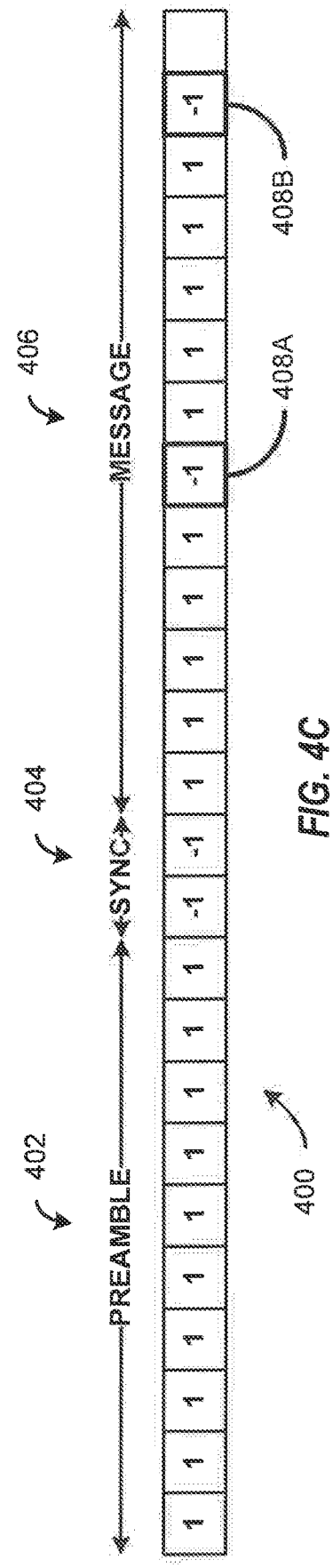
FIG. 4C is a block diagram illustrating details of an example encoding of a universal CRS according to one aspect of the present disclosure.

One example of encoding the data of the message 406 is illustrated in FIGS. 4B and 4C. The example encoding technique for the data of the message 406 includes inserting extra bits 408A and 408B during the encoding of the data of the message 406. For example, an extra bit may be inserted every M≤N bits, wherein N is a predetermined number of bits not greater than a total number of bits of the at least one of the predetermined pattern or the combination of the predetermined pattern and the at least part of the SYNC. In the example of FIGS. 4B and 4C, the SYNC field 404 is set to [−1, −1], and it is possible for the message to be encoded with [1, 1, 1, 1, 1, 1, 1, 1, 1, −1, −1, −1, −1, −1, −1, −1, −1, −1, . . . ] or [−1, −1, −1, −1, −1, −1, −1, −1, . . . ]. In the first case, inserting a bit at M=10 would actually create a potential problem regardless of the value to which the extra bit is set. In the second case, the eight −1 bits of the message 406 would combine with the [−1, −1] bits of the SYNC field 404 to create a potential problem, and inserting a bit every M=9 bits would not avoid this potential problem. Therefore, constraining M to be less than N−1 is advisable for this particular choice of pattern for the preamble 402 and SYNC field 404. In the illustrated example, M=6, so an extra bit is always inserted every sixth bit in the data of the message 406, regardless of the contents of the data.

As shown in the example of FIG. 4C, the individual values of the inserted bits 408A and 408B may be chosen to prevent any and all occurrences, in the message 406, of the at least one of the predetermined pattern or the combination of the predetermined pattern of the preamble 402 and the at least part of the SYNC field 404. In the case of the example where M=6, this selection may be accomplished by setting the values of the inserted bits 408A and 408B to be different from the values of the respective preceding and/or subsequent bits of the message 406. If M=8, however, then the selection is better accomplished by setting the values of the inserted bits 408A and 408B to be different from the values of the respective preceding bits of the message 406, as opposed to the respective subsequent bits. For other patterns of the preamble 402, a different technique may be used to set the values of the individual, extra bits 408A and 408B. For example, extra bits 408A and 408B having a default value may be inserted initially, and string searches may be used to determine if a particular detection technique would find, in the message 406 or combination of the message and one or more SYNC field bits, the pattern or combination of the pattern plus one or more SYNC field 404 bits. If a match is found, then a value or values of one or more extra bits inserted in that portion of the message may be flipped to an alternative value. Then further string searches and, if needed, extra bit flips may be carried out until there are no matches found.

Figure 5:
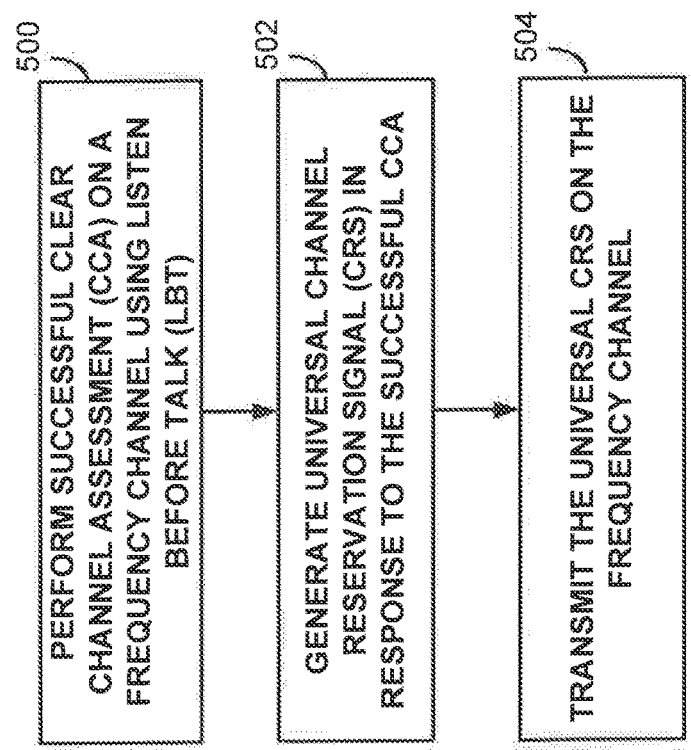
FIG. 5 is a block diagram illustrating example blocks of a wireless communication process according to one aspect of the present disclosure.

Turning now to FIG. 5, a method of wireless communication may be carried out by a transmitting wireless network node, such as a NR-SS base station 105 or UE 115 (see FIG. 2). Alternatively or additionally, the wireless network node may be any base station, terminal, or transceiver of any other RAT, such as WiFi. Beginning at block 500, the wireless network node performs a successful clear channel assessment (CCA) on a frequency channel in accordance with a listen before talk (LBT) protocol procedure. Processing may proceed from block 500 to block 502.

At block 502, the wireless network node generates a universal channel reservation signal that includes a preamble that has a predetermined pattern, a message having a same subcarrier spacing and a same symbol length as the preamble, and a synchronization field (SYNC) disposed between the preamble and the message. The message is encoded to prevent any and all occurrences therein of at least one of the predetermined pattern or a combination of the predetermined pattern and at least part of the SYNC. It is also envisioned that the message may additionally be encoded to prevent such an occurrence in a combination of the message and at least part of the SYNC field.

For example, the wireless network node may insert, in the message, an extra bit every M≤N bits, and select individual values of each of the extra bits to prevent any and all occurrences, in the message, of the at least one of the predetermined pattern or the combination of the predetermined pattern and the at least part of the SYNC. In this example, N is a predetermined number of bits not greater than a total number of bits of the at least one of the predetermined pattern or the combination of the predetermined pattern and the at least part of the SYNC. Alternatively or additionally, the wireless network node may select an encoding matrix for encoding data of the message, apply a mask to data of the message, and/or puncture data of the message. In such cases, it is envisioned that an additional field may be added to the CRS to indicate to the receiver a particular matrix, mask, puncturing pattern, or other selections made in the encoding, as previously described. Processing may proceed from block 502 to block 504.

At block 504, the wireless network node responds to the successful CCA performed at block 500 by transmitting the universal channel reservation signal on the frequency channel. It should be understood that the universal CRS may be generated, at block 502, prior to performance of the successful CCA at block 500 so that it can be transmitted at block 504 immediately in response to performance of the successful CCA. Processing may proceed from block 504 to further processing that carries out wireless communication with a target node as will be readily apparent to the skilled person.

Figure 6:
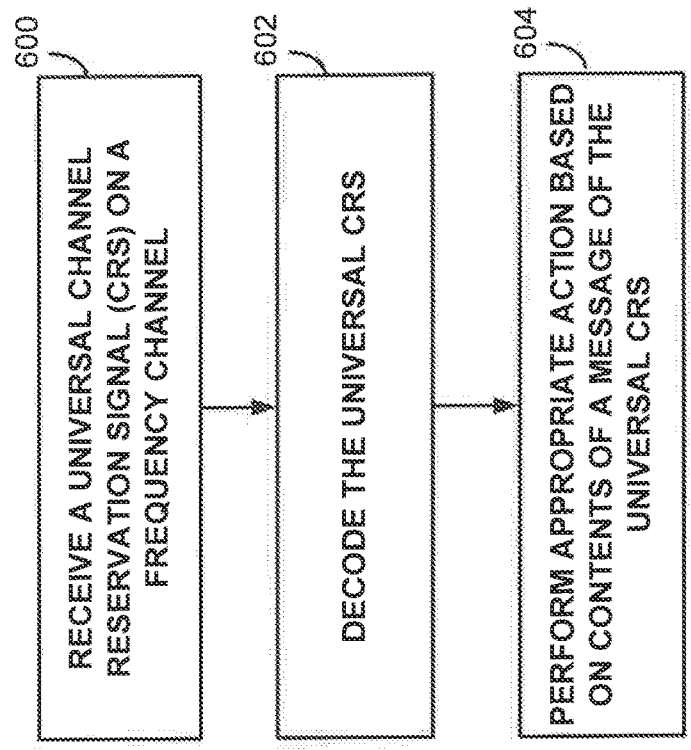
FIG. 6 is a block diagram illustrating example blocks of a wireless communication process according to one aspect of the present disclosure.

Referring now to FIG. 6, a method of wireless communication may be carried out by a receiving wireless network node, such as a NR-SS base station 105 or UE 115 (see FIG. 2). Alternatively or additionally, the wireless network node may be any base station, terminal, or transceiver of another RAT, such as WiFi. Beginning at block 600, the wireless network node may receive, on a frequency channel, a universal channel reservation signal transmitted by another wireless network node. As described above, the universal channel reservation signal was transmitted by the other wireless node in response to a successful clear channel assessment (CCA) performed by the other wireless network node on the frequency channel in accordance with a listen before talk (LBT) protocol procedure. Also, the universal channel reservation signal includes a preamble that has a predetermined pattern, a message having a same subcarrier spacing and a same symbol length as the preamble, and a synchronization field (SYNC) disposed between the preamble and the message. Further, the message is encoded to prevent any and all occurrences therein of at least one of the predetermined pattern or a combination of the predetermined pattern and at least part of the SYNC. Processing may proceed from block 600 to block 602.

At block 602, the wireless network node decodes the universal channel reservation signal based on knowledge of the encoding technique. For example, in the case that the encoding technique involves insertion of extra bits, as previously described, it is envisioned that this knowledge may be a priori knowledge due to, for example, standardization of the extra bit insertion. Alternatively or additionally, the wireless network node may select a decoding matrix for decoding data of the message, apply a mask to data of the message, and/or depuncture data of the message. In such cases, it is envisioned that wireless network node may observe an additional field added to the CRS to indicate to the receiver a particular matrix, mask, puncturing pattern, or other selections made in the encoding. As another alternative, the decoding may involve a maximum likelihood technique. For example, the receiver may determine, based on received samples, a maximum likelihood for each input sequence by computing a distance of the received samples with respect to each possible output of a plurality of possible outputs, and selecting one of the plurality of possible outputs having a minimum distance as a winning candidate. Processing may proceed from block 602 to block 604.

At block 604, the wireless network node may perform one or more appropriate actions based on information of the message of the universal CRS. For example, if the message indicates another RAT or another target node, then the wireless network node may avoid transmitting on the frequency channel or reduce transmission power on the frequency channel. However, if the message indicates that the wireless network node is the target node, then the wireless network node may carry out wireless communication with the other wireless network node utilizing the TXOP identified in the CRS message, as will be readily apparent to the skilled person.

As set forth above, the disclosed methods of wireless communication enable wireless network nodes to send and receive a universal CRS that utilizes a numerology of another RAT. As a result, information can be shared with devices of other RATs, and this information can be used to avoid transmitting or to reduce transmission power on frequency channels that are reserved based on a successful CCA. Advantageously, collisions and interference between devices of different RATs can be reduced or avoided.

Figure 7:
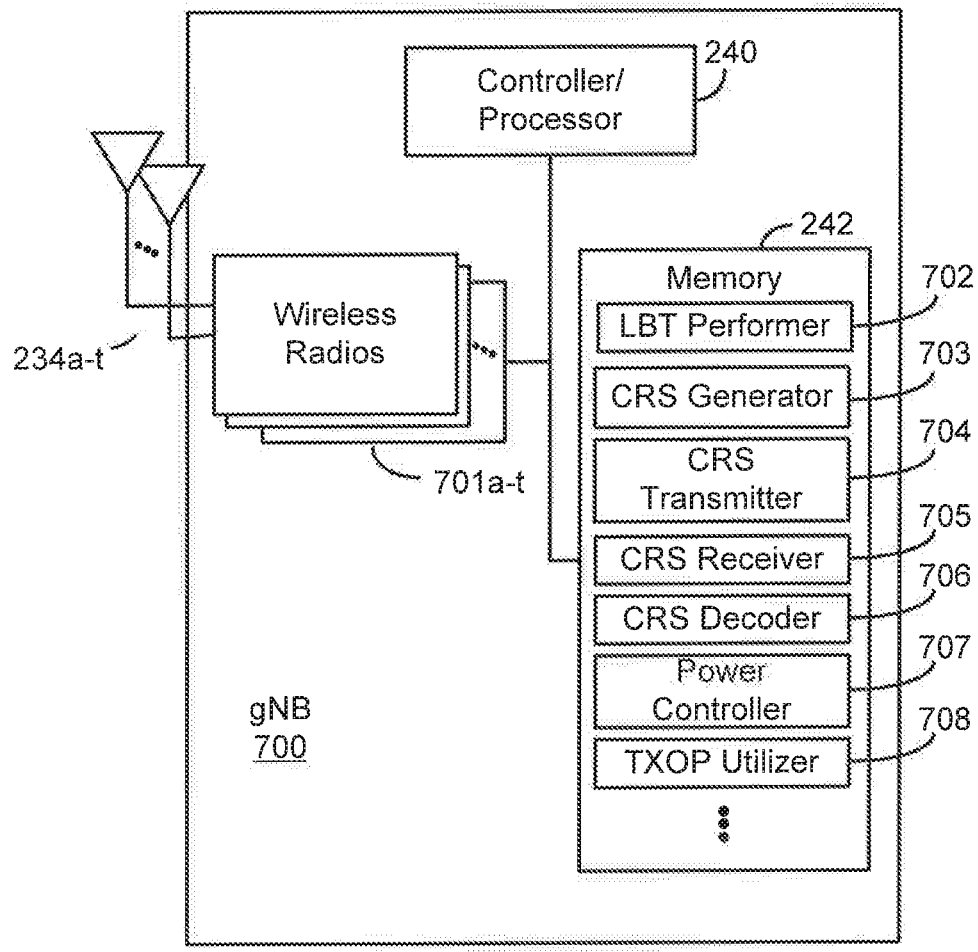
FIG. 7 is a block diagram illustrating an example of a next generation node B (gNB) according to one aspect of the present disclosure.

Turning to FIG. 7, a gNB 700, such as a NR-SS base station 105 (see FIG. 2), may have a controller/processor 240, a memory 242, and antennas 234a through 234t, as described above. The gNB 700 may also have wireless radios 701a to 701t that comprise additional components also described above with reference to FIG. 2. The memory 242 of gNB 700 stores algorithms that configure processor/controller 240 to carry out procedures as described above in FIGS. 5 and 6.

Some algorithms stored by memory 242 configure processor/controller 240 to carry out procedures in a transmit mode of operation. For example, LBT performer 702 configures controller processor 240 to carry out operations that include performing a successful clear channel assessment (CCA) on a frequency channel in accordance with a listen before talk (LBT) protocol procedure. Also, CRS generator 703 configures controller processor 240 to carry out operations that include generating a universal channel reservation signal that includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. It is also envisioned that the message may additionally be encoded to prevent such an occurrence in a combination of the message and at least part of the SYNC field. Further, CRS transmitter 704 configures controller processor 240 to carry out operations that include responding to the successful CCA by transmitting the universal channel reservation signal on the frequency channel.

Other algorithms stored by memory 242 configure processor/controller 240 to carry out procedures in a receive mode of operation. For example, CRS receiver 705 configures controller processor 240 to carry out operations that include receiving, on a frequency channel, a universal channel reservation signal transmitted by another wireless network node. Additionally, CRS decoder 706 configures controller processor 240 to carry out operations that include decoding the universal CRS based on knowledge of the encoding technique. For example, in the case that the encoding technique involves insertion of extra bits, as previously described, it is envisioned that this knowledge may be a priori knowledge due to, for example, standardization of the extra bit insertion. Alternatively or additionally, gNB 700 may select a decoding matrix for decoding data of the message, apply a mask to data of the message, and/or depuncture data of the message. In such cases, it is envisioned that gNB 700 may observe an additional field added to the CRS to indicate to the receiver a particular matrix, mask, puncturing pattern, or other selections made in the encoding. Also, power controller 707 configures controller processor 240 to carry out operations that include avoiding transmitting on the frequency channel or reducing transmission power on the frequency channel if the message of the decoded CRS indicates another RAT or another target node. Further, TXOP utilizer 708 configures controller processor 240 to carry out operations that include carrying out wireless communication with the other wireless network node utilizing the TXOP identified in the CRS message if the message of the CRS indicates that gNB 700 is the target node.

Figure 8:
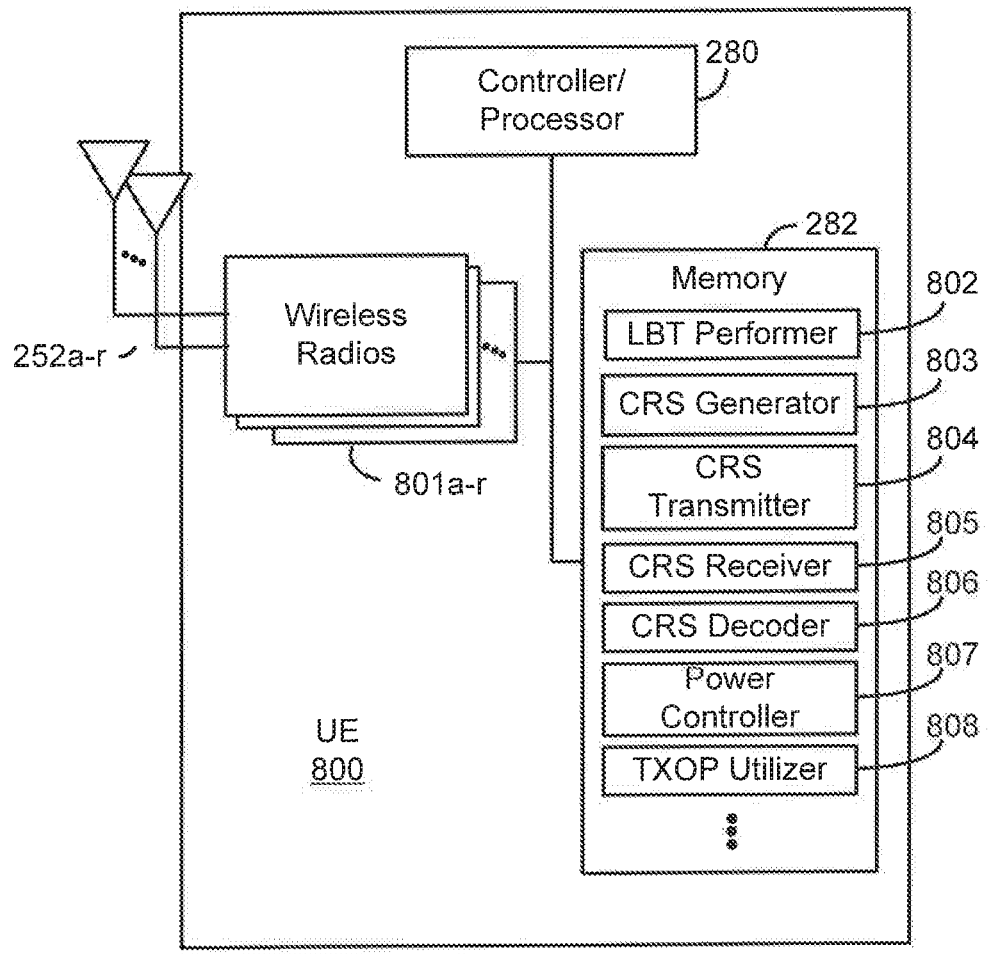
FIG. 8 is a block diagram illustrating an example of a user equipment (UE)) according to one aspect of the present disclosure.

Turning to FIG. 8, a UE 800, such as a 105 (see FIG. 2), may have a controller/processor 280, a memory 282, and antennas 252a through 252r, as described above. UE 800 may also have wireless radios 801a to 801r that comprise additional components also described above with reference to FIG. 2. The memory 282 of UE 800 stores algorithms that configure processor/controller 280 to carry out procedures as described above in FIGS. 5 and 6.

Some algorithms stored by memory 282 configure processor/controller 280 to carry out procedures in a transmit mode of operation. For example, LBT performer 802 configures controller processor 280 to carry out operations that include performing a successful clear channel assessment (CCA) on a frequency channel in accordance with a listen before talk (LBT) protocol procedure. Also, CRS generator 803 configures controller processor 280 to carry out operations that include generating a universal channel reservation signal that includes a preamble that has a predetermined pattern, a message having a same short period waveform as the preamble, and a synchronization field (SYNC) disposed between the preamble and the message. The message is encoded to prevent any and all occurrences therein of at least one of the predetermined pattern or a combination of the predetermined pattern and at least part of the SYNC. It is also envisioned that the message may additionally be encoded to prevent such an occurrence in a combination of the message and at least part of the SYNC field. Further, CRS transmitter 804 configures controller processor 280 to carry out operations that include responding to the successful CCA by transmitting the universal channel reservation signal on the frequency channel.

Other algorithms stored by memory 282 configure processor/controller 280 to carry out procedures in a receive mode of operation. For example, CRS receiver 805 configures controller processor 280 to carry out operations that include receiving, on a frequency channel, a universal channel reservation signal transmitted by another wireless network node. Additionally, CRS decoder 806 configures controller processor 280 to carry out operations that include decoding the universal CRS based on knowledge of the encoding technique. For example, in the case that the encoding technique involves insertion of extra bits, as previously described, it is envisioned that this knowledge may be a priori knowledge due to, for example, standardization of the extra bit insertion. Alternatively or additionally, UE 800 may select a decoding matrix for decoding data of the message, apply a mask to data of the message, and/or depuncture data of the message. In such cases, it is envisioned that UE 800 may observe an additional field added to the CRS to indicate to the receiver a particular matrix, mask, puncturing pattern, or other selections made in the encoding. Also, power controller 807 configures controller processor 280 to carry out operations that include avoiding transmitting on the frequency channel or reducing transmission power on the frequency channel if the message of the decoded CRS indicates another RAT or another target node. Further, TXOP utilizer 808 configures controller processor 280 to carry out operations that include carrying out wireless communication with the other wireless network node utilizing the TXOP identified in the CRS message if the message of the CRS indicates that UE 800 is the target node.

As set forth above, the disclosed wireless network nodes are able to send and receive a universal CRS that utilizes a numerology of another RAT. As a result, information can be shared with devices of other RATs, and this information can be used to avoid transmitting or to reduce transmission power on frequency channels that are reserved based on a successful CCA. Advantageously, collisions and interference between devices of different RATs can be reduced or avoided.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
performing, by a wireless network node, a successful clear channel assessment (CCA) on a frequency channel in accordance with a listen before talk (LBT) protocol procedure, wherein the wireless network node operates in accordance with a first wireless communication protocol;
generating a channel reservation signal, by the wireless network node, wherein the channel reservation signal includes a preamble that has a predetermined pattern, a message having a same short period waveform as the preamble, and a synchronization field (SYNC) disposed between the preamble and the message, and wherein the message is encoded to prevent any and all occurrences therein of at least one of the predetermined pattern or a combination of the predetermined pattern and at least part of the SYNC, and wherein the channel reservation signal has a subcarrier spacing and symbol length in accordance with a numerology of a second wireless communication protocol that uses a numerology that is not the same as that of the first wireless communication protocol; and
transmitting, by the wireless network node in response to the successful CCA, the channel reservation signal on the frequency channel.

2. The method of claim 1, wherein the predetermined pattern is a predetermined number N of short period waveforms.

3. The method of claim 2, wherein at least one of:
the predetermined pattern is entirely composed of consecutively identical short period waveforms; or
the SYNC corresponds to exactly two waveforms.

4. The method of claim 3, wherein at least one of:
the predetermined pattern corresponds to a Short Training Field (STF) in compliance with a WiFi wireless communication protocol; or
the exactly two short period waveforms have a same short period as the short period waveforms of the preamble.

5. The method of claim 1, wherein generating the channel reservation signal includes inserting, in the message, an extra bit every M N bits, and selecting individual values of each of the extra bits to prevent any and all occurrences, in the message, of the at least one of the predetermined pattern or the combination of the predetermined pattern and the at least part of the SYNC, wherein N is a predetermined number of bits not greater than a total number of bits of the at least one of the predetermined pattern or the combination of the predetermined pattern and the at least part of the SYNC.

6. The method of claim 1, wherein content of the message includes at least one of a duration of a transmission opportunity, an identification of a target node, an interference level, or a type of Radio Access Technology (RAT).

7. The method of claim 1, wherein the wireless network node is at least one of a base station or a user equipment (LIE).

8. The method of claim 1, wherein the first wireless communication protocol is a New Radio-Shared Spectrum (NR-SS) wireless communication protocol.

9. The method of claim 1, wherein the second wireless communication protocol is Win wireless communication protocol.

10. An apparatus configured for wireless communication, the apparatus comprising:
at least one processor; and
a memory coupled with the at least one processor, wherein the memory includes instructions executable by the processor to cause the apparatus to:
perform a successful clear channel assessment (CCA) on a frequency channel in accordance with a listen before talk (LBT) protocol procedure, wherein the apparatus operates in accordance with a first wireless communication protocol;
generate a channel reservation signal wherein the channel reservation signal includes a preamble that has a predetermined pattern, a message having a same short period waveform as the preamble, and a synchronization field (SYNC) disposed between the preamble and the message, and wherein the message is encoded to prevent any and all occurrences therein of at least one of the predetermined pattern or a combination of the predetermined pattern and at least part of the SYNC, and wherein the channel reservation signal has a subcarrier spacing and symbol length in accordance with a numerology of a second wireless communication protocol that uses a numerology that is not the same as that of the first wireless communication protocol; and
transmit, in response to the successful CCA, the channel reservation signal on the frequency channel.

11. The apparatus of claim 10, wherein the predetermined pattern is a predetermined number N of short period waveforms.

12. The apparatus of claim 10, wherein the instructions further cause the apparatus to generate the channel reservation signal at least in part by inserting, in the message, an extra bit every $M \leq N$ bits, and selecting individual values of each of the extra bits to prevent any and all occurrences, in the message, of the at least one of the predetermined pattern or the combination of the predetermined pattern and the at least part of the SYNC, wherein N is a predetermined number of bits not greater than a total number of bits of the at least one of the predetermined pattern or the combination of the predetermined pattern and the at least part of the SYNC.

13. The apparatus of claim 10, wherein content of the message includes at least one of a duration of a transmission opportunity, an identification of a target node, an interference level, or a type of Radio Access Technology (RAT).

14. The apparatus of claim 10, wherein the apparatus is at least one of a base station or a user equipment (LTE).

15. A method of wireless communication, the method comprising:
receiving on a frequency channel, by a wireless network node, a channel reservation signal transmitted by another wireless network node in response to a successful clear channel assessment (CCA) performed by the other wireless network node on the frequency channel in accordance with a listen before talk (LBT) protocol procedure, wherein the channel reservation signal includes a preamble that has a predetermined pattern, a message having a same short period waveform as the preamble, and a synchronization field (SYNC) disposed between the preamble and the message, and wherein the message is encoded to prevent any and all occurrences therein of at least one of the predetermined pattern or a combination of the predetermined pattern and at least part of the SYNC; and decoding, by the wireless network node, the channel reservation signal, wherein the wireless network node operates in accordance with a first wireless communication protocol, and wherein the channel reservation signal has a subcarrier spacing and symbol length in accordance with a numerology of a second wireless communication protocol that uses a numerology that is not the same as that of the first wireless communication protocol.

16. The method of claim 15, wherein the predetermined pattern is a predetermined number N of short period waveforms.

17. The method of claim 16, wherein at least one of:
the predetermined pattern is entirely composed of consecutively identical short period waveforms; or
the SYNC corresponds to exactly two waveforms.

18. The method of claim 17, wherein at least one of:
the predetermined pattern corresponds to a Short Training Field (STF) in compliance with a WiFi wireless communication protocol; or
the exactly two waveforms have a same short period as the short period waveforms of the preamble.

19. The method of claim 15, wherein content of the message includes at least one of a duration of a transmission opportunity, an identification of a target node, an interference level, or a type of Radio Access Technology (RAT).

20. The method of claim 15, wherein the wireless network node is at least one of a base station or a user equipment (UE).

21. The method of claim 15, wherein the first wireless communication protocol is a New Radio-Shared Spectrum (NR-SS) wireless communication protocol.

22. The method of claim 15, wherein the second wireless communication protocol is WiFi wireless communication protocol.

23. The method of claim 15, wherein the decoding includes:

determining, based on received samples, a maximum likelihood for each input sequence by computing a distance of the received samples with respect to each possible output of a plurality of possible outputs; and
selecting, as a winning candidate, one of the plurality of possible outputs having a minimum distance.

24. An apparatus configured for wireless communication, apparatus comprising:
at least one processor; and
a memory coupled with the at least one processor, wherein the memory includes instructions executable by the processor to cause the apparatus to:
receive on a frequency channel a channel reservation signal transmitted by a wireless network node in response to a successful clear channel assessment (CCA) performed by, the wireless network node on the frequency channel in accordance with a listen before talk (LBT) protocol procedure, wherein the channel reservation signal includes a preamble that has a predetermined pattern, a message having a same short period waveform as the preamble, and a synchronization field (SYNC) disposed between the preamble and the message, and wherein the message is encoded to prevent any and all occurrences therein of at least one of the predetermined pattern or a combination of the predetermined pattern and at least part of the SYNC; and
decode the channel reservation signal, wherein the apparatus operates in accordance with a first wireless communication protocol, and wherein the channel reservation signal has a subcarrier spacing and symbol length in accordance with a numerology of a second wireless communication protocol that uses a numerology that is not the same as that of the first wireless communication protocol.

25. The apparatus of claim 24, wherein the predetermined pattern is a predetermined number N of short period waveforms.

26. The apparatus of claim 24, wherein content of the message includes at least one of a duration of a transmission opportunity, an identification of a target node, an interference level, or a type of Radio Access Technology (RAT).

27. The apparatus of claim 24, wherein the apparatus is at least one of a base station or a user equipment (UE).

28. The apparatus of claim 24, wherein the first wireless communication protocol is a New Radio-Shared Spectrum (NR-SS) wireless communication protocol.

* * * * *